Nov. 7, 1967 H. E. DARLING 3,351,851

BALANCED MAGNETIC AMPLIFICATION AND PROCESS CONTROL APPARATUS

Filed June 26, 1964 3 Sheets-Sheet 1

INVENTOR.
HORACE E. DARLING

BY
Curtis, Morris & Safford
ATTORNEYS

BALANCED MAGNETIC AMPLIFICATION AND PROCESS CONTROL APPARATUS

Filed June 26, 1964

INVENTOR.
HORACE E. DARLING
BY
Curtis, Morris & Safford
ATTORNEYS

BALANCED MAGNETIC AMPLIFICATION AND PROCESS CONTROL APPARATUS

Filed June 26, 1964

3 Sheets-Sheet 3

INVENTOR.
HORACE E. DARLING

BY
Curtis, Morris & Safford
ATTORNEYS 3,351,851
BALANCED MAGNETIC AMPLIFICATION AND PROCESS CONTROL APPARATUS Horace E. Darling, North Attleboro, Mass., assignor to The Foxboro Company, Foxboro, Mass., a corporation of Massachusetts Filed June 26, 1964, Ser. No. 378,132
13 Claims. (Cl. 323—89)

ABSTRACT OF THE DISCLOSURE

The balanced magnetic amplifier has dual magnetic cores with the load windings on the cores being connected to the load in a pattern which causes load currents controlled by the flux in one core always to oppose load currents controlled by the flux in the other core, with the polarity of each current reversing during each successive half-cycle of alternating source current. Control windings and bias windings also are provided. The alternating output voltage is filtered and averaged over a full cycle of source current so as to provide a relatively smooth direct current output signal proportional to the control winding input signal. Because of the balanced load winding connection, errors due to mismatch or aging of the cores cancel one another over a full cycle of source current and the amplifier remains balanced within close tolerances. A process controller is described in which the balanced magnetic amplifier is utilized as a sensitive input stage, and a balanced transistor amplifier is used as a second stage. Another magnetic amplifier is provided as a third stage to regulate the conduction of a controlled rectifier and thereby control the process variable. A portable plug-in manual control unit also is provided for the process controller.

Figure 1:
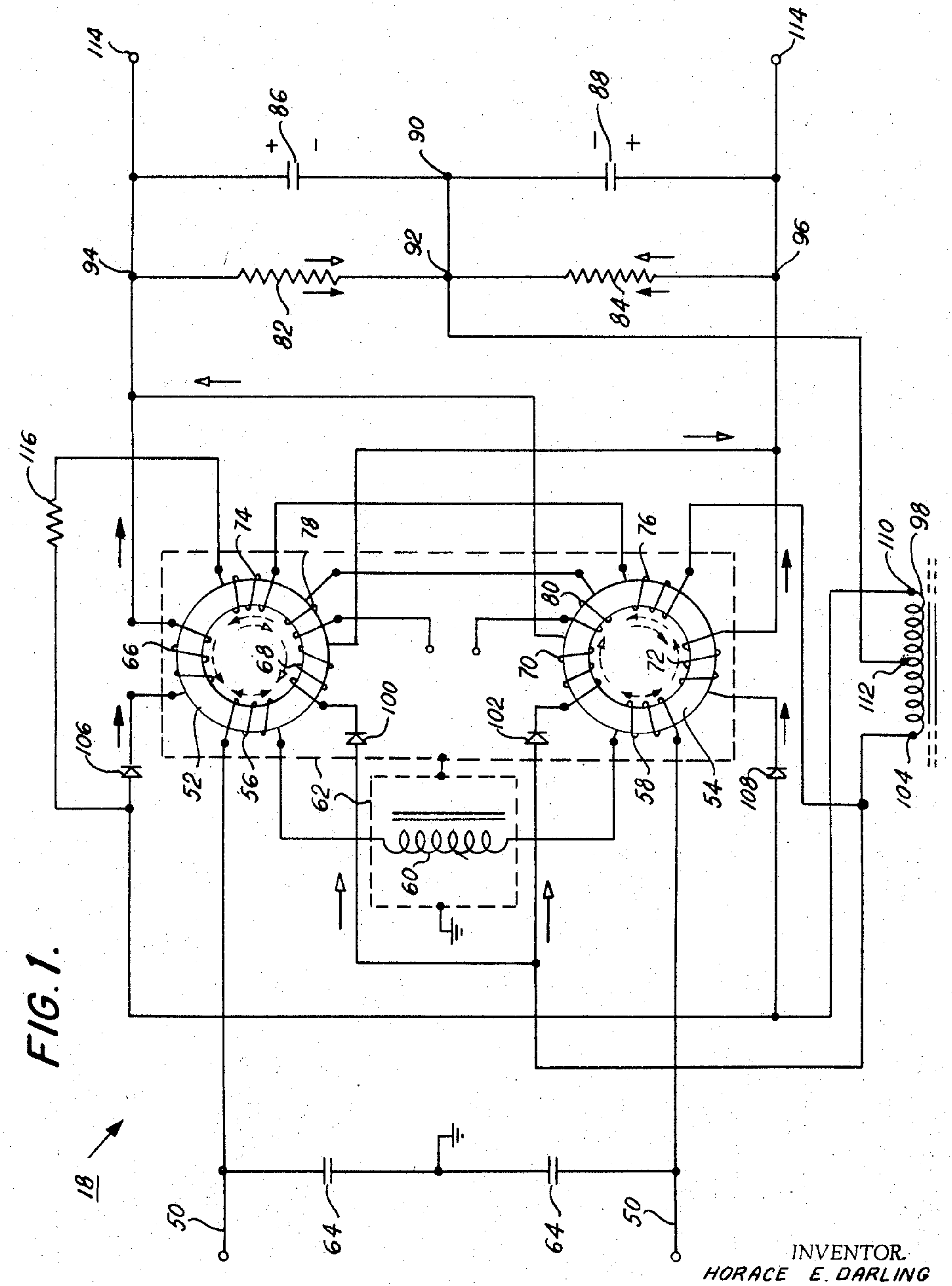

This invention relates to electrical amplifiers especially useful in industrial process instrument systems. More in particular, this invention relates to low-level balanced magnetic amplifiers. As an illustrative embodiment of the invention, there is described hereinbelow novel control apparatus utilizing such an amplifier for regulating the flow of electrical energy to a load to maintain a process condition at a desired value.

In order to achieve accurate measurement and/or control in industrial processes, it is necessary in many instances to detect and amplify extremely small electrical signals. Various types of electrical apparatus have been proposed for such purposes, and a particular advantageous approach has been found in the use of balanced magnetic amplifiers, that is, magnetic amplifiers in which electrical signals are combined in opposition to one another to stabilize the amplifier output signal.

In previous balanced magnetic amplifiers there have been provided at least two saturable magnetic cores each carrying a gate winding which is energized only during alternate half-cycles of the A-C supply voltage. Such amplifiers are shown, for example, in my U.S. Patent 3,102,229. This type of amplifier is useful because it is relatively insensitive to changes in certain operating conditions. However, the ability of such an amplifier to detect very low level signals also is a function of how closely the cores are "matched."

In "matching" magnetic cores, it is attempted to build and select cores which react in nearly the same way to operating and environmental changes. For very low-level signals, considerable effort and expense may be required to achieve the required matching of the cores. Thus, there is a need to minimize the requirements for matching of cores in magnetic amplifiers, since this would not only reduce the cost of manufacturing the amplifiers, but also make possible the achievement of significantly improved amplifier performance.

Accordingly, it is one object of this invention to provide improved magnetic amplifiers. A more specific object of this invention is to provide a magnetic amplifier the performance of which is less dependent upon the exact matching of core materials. Still another object of this invention is to provide improved process control apparatus. Other objects, aspects and advantages of the present invention will be pointed out in, or apparent from the following description.

Figure 2:
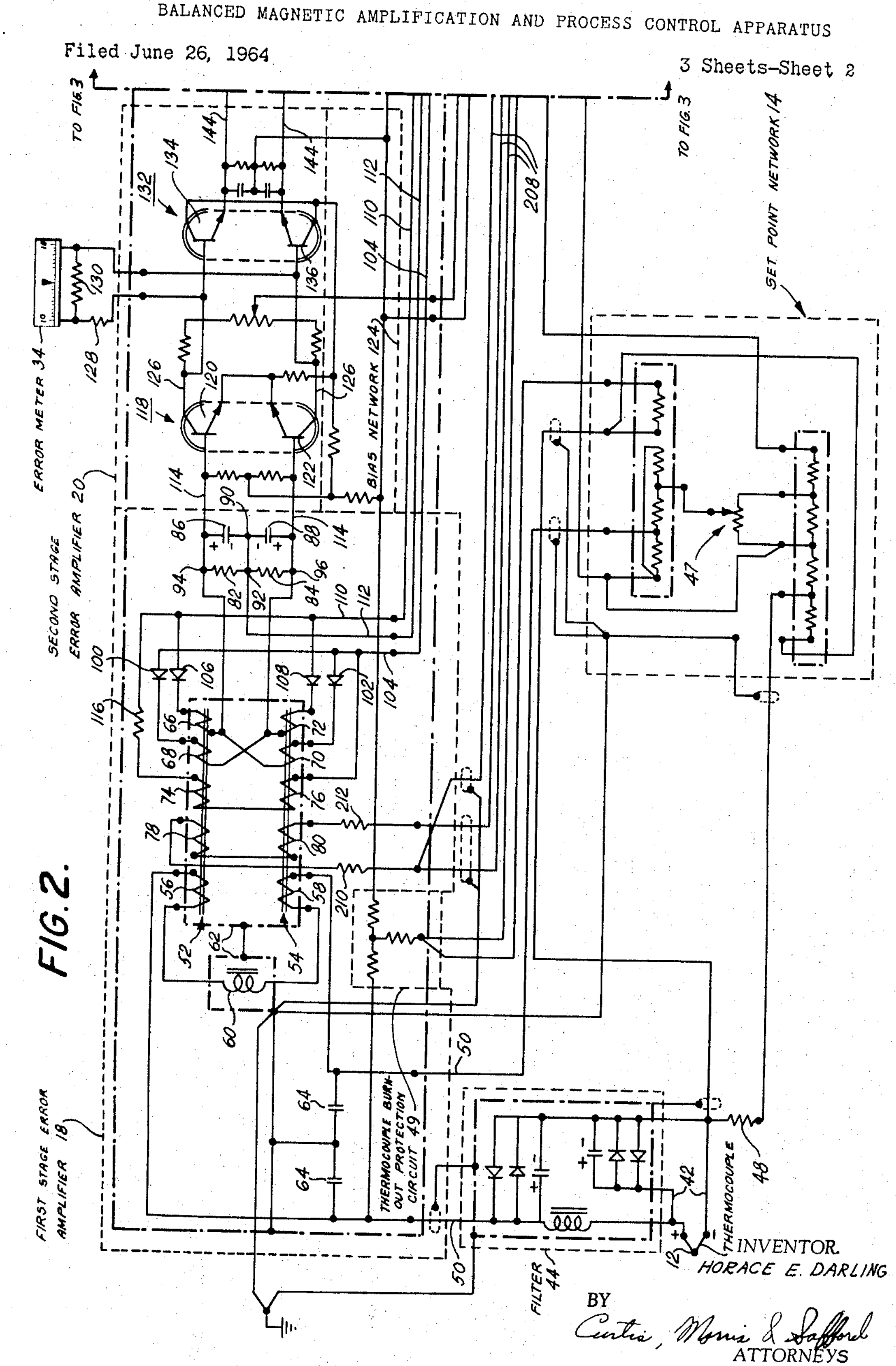
Figures 3, 4:
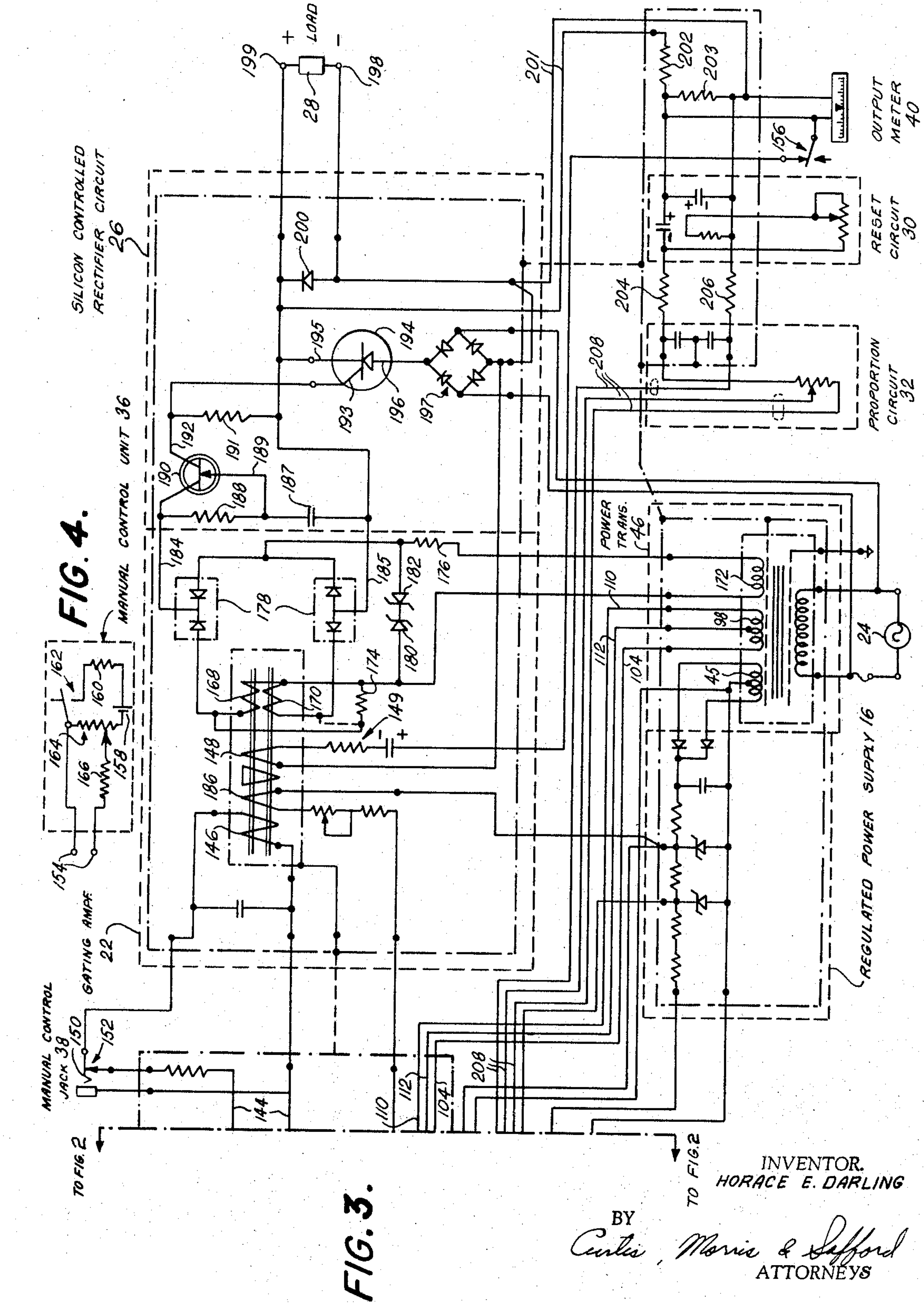

In the drawings:

FIGURE 1 is a schematic circuit diagram of a balanced magnetic amplifier embodying the present invention;

FIGURES 2 and 3 together form a schematic circuit diagram showing a process controller incorporating a balanced magnetic amplifier of the type shown in FIGURE 1; and FIGURE 4 is a schematic circuit diagram of a plug-in unit for making manual settings of the output of the controller of FIGURES 2 and 3.

Amplifier 18, shown in FIGURES 1 and 2, is a low-level balanced magnetic amplifier including a pair of saturable magnetic cores 52 and 54 having respective control windings 56 and 58 connected to leads 50 to receive an input signal. Control windings 56 and 58 are connected together in series through a high-impedance choke 60.

Two pairs of identical load windings, 66 and 68 and 70 and 72, are wound, respectively, on cores 52 and 54. In addition, identical A-C bias windings 74 and 76 and feedback windings 78 and 80 are wound, respectively, on cores 52 and 54.

Two identical load resistors 82 and 84 are connected in series with one another and are connected in parallel, respectively, with two identical filter capacitors 86 and 88. The common point 90 between the capacitors 86 and 88 is joined to the common point 92 between resistors 82 and 84. Output load windings 66 and 70 both are connected to the upper terminal 94 of resistor 82. Similarly, output windings 68 and 72 are connected to the lower terminal 96 of resistor 84. This is a "criss-cross" arrangement in which the output windings on each core are connected to opposite ends of the load resistor combination.

The load windings of amplifier 18 are energized from a center-tapped secondary winding 98 of a power supply transformer. The two halves of secondary winding 98 are matched to make their outputs identical. Load windings 68 and 70 are connected, respectively, through diodes 100 and 102 to one end 104 of secondary winding 98. The other load windings 66 and 72 are similarly connected through corresponding diodes 106 and 108 to the other end 110 of secondary winding 98. The common point 92 between load resistors 82 and 84 is connected to the center tap 112 of secondary winding 98.

The operation of amplifier 18 now will be explained for the conditions in which there is no signal input to control windings 56 and 58, no signal supplied to feedback windings 78 and 80, and in which bias windings 74 and 76 are not energized.

During positive half-cycles of supply current, i.e., when terminal 104 of secondary winding 98 is positive with respect to terminal 110, diodes 100 and 102 conduct currents through load windings 68 and 70 and load resistors 82 and 84, in the directions indicated by the open-headed arrows. These load currents return to center-tap 112 of transformer secondary winding 98. At this time, diodes 106 and 108 are reverse-biased and do not conduct current through output windings 66 and 72.

During the next or negative half-cycle, i.e., during the half-cycle in which terminal 110 of secondary winding 98 is positive with respect to terminal 104, diodes 106 and 108 are forward-biased and current flows through windings 66 and 72 and the load resistors in the directions indicated by the solid-headed arrows. Diodes 100 and 102 are now reverse-biased and do not conduct current through load windings 68 and 70.

From the foregoing, it can be seen that the component of load current which is controlled by the flux in core 52 develops across load terminals 94 and 96 an output signal which alternates in polarity during each half-cycle of source current, and which always opposes the output signal developed by the component of load current which is controlled by the flux in core 54. Furthermore, the particular load resistor through which flows the load current controlled by the flux in a particular core alternates during each half-cycle of source current.

In further explanation of the foregoing, the flux flowing in core 52 controls the load current flowing through load windings 66 and 68. In this sense, then, this load current is "derived" from core 52. During positive half-cycles of source current, load current flows through load winding 68 and resistor 84 in the direction indicated by the open-headed arrow near resistor 84. Assuming that voltages increasing in the direction from terminal 96 to terminal 94 are positive, this flow develops a negative output voltage signal across terminals 94 and 96. During negative half-cycles of source current load current flows through load winding 66 and resistor 82 in a direction such as to develop a positive output voltage signal across terminals 94 and 96. At the same time, the load current flowing through load windings 70 and 72, which is controlled by the flux in core 54, is conducted through the load resistors in a sense which is at substantially all times opposite to that in which load current derived from core 52 flows. Also, load current derived from core 54 flows through the load resistor opposite to that through which load current derived from core 52 flows.

If the diodes, load windings, load resistors, capacitors and transformer secondary windings are matched as indicated above, the average output signal delivered to output terminals 114 will be essentially zero even though cores 52 and 54 are not precisely matched. This is because the output signal derived from each core always opposes the signal derived from the other core and reverses in polarity during every half-cycle of source current. The signal across the load resistors is smoothed and averaged by capacitors 86 and 88. Therefore, the output signal at terminals 114 is the average value of the signal developed across the load resistors.

Thus, if, due to differences between the characteristics of the cores, core 52 should happen to saturate at an earlier time in a half-cycle than does core 54, this creates a net difference voltage of one polarity across terminals 94 and 96 during that half-cycle. However, since the load current derived from each core is reversed in polarity during the next half-cycle, there is developed across terminals 94 and 96 during the next half-cycle another net difference voltage equal in magnitude but opposite in polarity to the first difference voltage. The average value of these difference voltages, taken over a full cycle of source current, is effectively zero. Since the voltage at output terminals 114 is the full-cycle average of the voltage across the load resistors, the net output difference voltage is zero and the amplifier is balanced despite mismatch of the cores.

Moreover, amplifier 18 stays balanced within precise limits despite any difference between cores 52 and 54 in their reactions to environmental changes such as temperature or strain, or due to aging.

In more detail, environmental changes normally can be considered to affect the electrical characteristics of each core in a substantially identical manner during positive half-cycles of flux as during negative half-cycles.

For example, if such changes cause an alteration of the permeability of one core so that it saturates earlier during positive half-cycles, then that core also saturates earlier by about the same amount of time during negative half-cycles. Thus, an equal change in output is produced by that core during each cycle. However, the successive half-cycle outputs produced by this core generate voltages of opposite polarity with respect to terminals 94 and 96. Therefore, the difference voltages developed due to the variation in reactions of the cores to environmental changes tend to be cancelled out over a full cycle of source current, so that amplifier 18 remains balanced.

It should be understood that the "environmental changes" referred to above include changes in ambient temperature, changes in physical strain on the cores, aging of the cores, etc. The unbalancing core signals resulting from these changes are sometimes known as "noise" signals. Thus, the amplifier of the present invention tends to cancel "noise" signals over a full cycle of source current. In addition, since A-C current is supplied to both cores simultaneously from the same source, power line transients are cancelled and have no influence on the amplifier's output.

When a D-C input signal is applied to leads 50 a D-C output voltage signal will be developed across output leads 114. This output voltage is the steady average value of a series of D-C pulses having a frequency twice that of the supply voltage. The magnitude and polarity of this D-C output signal depends on the magnitude and polarity of the input signal.

Control windings 56 and 58 are wound on cores 52 and 54 in a direction such that the flux produced in one core is opposite in direction to that produced in the other. By connecting the control windings together in series, the fundamental frequency voltages induced in them by the alternating flux in the cores will cancel and will not be transmitted to the input signal source. Choke 60 presents a high impedance to second and higher harmonic induced voltages and impedes their transmission to the input source.

Bias windings 74 and 76 of cores 52 and 54 are connected to terminals 110 and 104, respectively, of secondary winding 98, and are connected together in series with one another. Thus, they provide an alternating current bias in the cores. A resistor 116 is connected to winding 74 to provide a proper magnitude and phase relation with respect to the voltage supplied to the output windings. These bias windings are used to increase the gain of the amplifier by producing flux which aids the load-winding flux in each core.

Feedback windings 78 and 80 can be used to provide the usual magnetic amplifier feedback function, as will be discussed in greater detail below.

A major advantage of amplifier 18 over previous balanced magnetic amplifiers is that the extreme care previously used in matching magnetic cores is not required. This means that good performance can be obtained at a reduced manufacturing cost. It also is possible to use less expensive cores than those used previously. Thus, the present invention makes it possible to provide, at relatively low cost, stable balanced magnetic amplifiers capable of amplifying extremely small signals.

Cores 52 and 54, their windings, and choke 60 all are enclosed in a shield 62 which is connected to chassis ground in order to equalize the capacitance between each terminal of the choke and chassis ground.

Two identical capacitors 64 are connected together in series between input leads 50, and their common point is connected to chassis ground. These capacitors provide a by-pass for unwanted alternating current signals to prevent their being fed into the input of amplifier 18.

In FIGURES 2 and 3 is shown a process controller utilizing the amplifier 18 shown in FIGURE 1 for providing control of the temperature of an industrial process. A thermocouple 12 develops a D-C signal proportional to the process temperature. Thermocouple 12 is shown connected by a pair of leads 42 to an LC filter 44 whose purpose is to reduce to a negligible value voltages induced at power supply frequencies in the thermocouple leads 42. The output of the filter 44 is connected in series-opposition to the D-C output voltage of a "set-point" network 14. Set point network 14 is supplied by precision regulated power supply 16 (see FIGURE 3) which is energized by a secondary winding 45 of a power transformer 46 which is, in turn, energized by an A-C supply 24. Set-point network 14 includes a set-point adjustment potentiometer 47 which controls the output voltage of the network. A thermocouple compensation resistor 48 also is provided to compensate, in the usual way, for changes in the "cold junction temperature" of the thermocouple 12. A protection circuit 49 is provided to prevent the controller from becoming greatly unbalanced in case the thermocouple 12 burns out.

When the output voltage of filter 44 is different from the voltage developed by the set-point network 14 there will be developed across the input leads 50 for the first-stage error amplifier 18 an error signal having a magnitude proportional to the deviation of the temperature from the desired set-point value, and having a polarity determined by whether the measured temperature is above or below the set-point.

This error signal, which usually is quite small, is greatly amplified by first stage error amplifier 18 which produces, in the manner described above, a smooth, steady D-C output signal whose polarity depends upon the polarity of the error signal.

The amplified error signal developed between output terminals 114 of amplifier 18 is directed to the second-stage error amplifier 20. Amplifier 20 includes a balanced transistor amplifier section generally indicated at 118 which, in turn, includes a pair of transistors 120 and 122 connected together in a common-emitter balanced amplifier circuit arrangement. A bias and supply network 124 is connected to regulated power supply 16 and provides amplifier section 118 and remainder of amplifier 20 with power and bias supply voltages.

Amplifier section 118 provides an amplified error signal at its output terminals 126. An error meter 34 is connected between terminals 126 through a series current-limiting resistor 128 and a shunt resistor 130. Error meter 34 provides a visual indication of the magnitude of the error signal. This arrangement eliminates the need for an additional amplifier to amplify the small error signal to a value high enough to allow the use of a standard, relatively inexpensive meter. The use of transistor amplifier section 118 allows the meter to be connected to leads 126 without danger of overloading the second stage error amplifier.

The amplified error signal appearing across terminals 126 then is transmitted to an emitter-follower circuit indicated generally at 132. Emitter-follower circuit 132 includes a pair of transistors 134 and 136 and is used to match the output impedance of second stage error amplifier 20 to the input impedance of gating amplifier 22.

The use of transistor amplifier stage 20 together with the input magnetic amplifier 18 has been found to be a specially advantageous combination which provides sensitive detection of error signals together with sufficiently fast response to assure stable controller operation.

The amplified error signal appearing across output leads 144 of amplifier 20 is applied to the control winding 146 of gating amplifier 22. Gating amplifier 22 is a standard magnetic amplifier having a feedback winding 148 which is connected to the output of the controller to introduce a feedback signal into its output and provide frequency response control (anti-hunt) and thereby stabilize amplifier 22. A series R-C circuit 149 is connected between winding 148 and the controller output to provide phase adjustment for the winding.

It is sometimes desired to manually control the output of the controller. Novel apparatus has been provided for this purpose in the present invention. A small manual control unit 36 is shown in FIGURE 4. It is adapted to be plugged into a manual control jack 38 to disconnect the automatic control portions of the controller and provide means for manually adjusting the output of the controller.

The terminals of manual control jack 38 are connected across control winding 146 of gating amplifier 22. One terminal 150 of control jack 38 controls the operation of a normally-closed switch 152 which connects the upper output lead 144 of second stage error amplifier 20 to control winding 146.

Referring now to FIGURE 4, manual control unit 36 has a pair of male plug members 154 which are adapted to be inserted into the terminals of manual control jack 38. When plug members 154 are inserted into the manual control jack 38, normally-closed switch 156 (see FIGURE 3) which connects feedback winding 148 to the output of the controller also is opened by the insertion of plug members 154 into the jack so that the anti-hunt property is no longer provided by winding 148.

Manual control unit 36 is a small control unit which may be carried by a maintenance operator. This unit includes a dry cell 158 connected in series with a current-limiting resistor 160, a normally-open switch 162 which is operable at the exterior of the manual control unit, and a potentiometer 164. The lower plug member is connected through a current-limiting resistor 166 to the wiper arm of potentiometer 164 and the upper terminal is connected to the junction between switch 162 and the potentiometer 164. The setting of potentiometer 164 may be adjusted by the operator at the exterior of the manual control unit.

With this arrangement, a manually variable voltage is supplied to plug terminals 154. When these terminals are inserted into manual control jack 38, the automatic control circuitry of the controller is disabled and the operator may set the output voltage of the controller at any desired value. Output meter 40 gives an indication of this output voltage during both automatic and manual operation of the controller.

The use of manual control unit 36 as described above provides direct switching into the manual control mode of operation without the use of additional switching, dummy loads or balancing adjustment. Thus, this unit considerably simplifies the controller and the process of adjusting it. Further, in a factory installation utilizing a large number of controllers such as that of the present invention, only one person has the power to adjust each of the controllers. This insures that only competent, trained personnel will be able to adjust the controllers. It also reduces the complexity of each controller in that a single control unit is used for a plurality of controllers.

The output windings 168 and 170 of amplifier 22 are supplied from a secondary winding 172 of transformer 46 through a phase-compensating resistor 174, another resistor 176, and a full-wave bridge rectifier circuit 178. Zener diodes 180 and 182 are connected back-to-back between the lines from secondary winding 172. With this arrangement, the voltage supplied to output windings 168 and 170 has a square wave-shape and the signal appearing across output terminals 184 and 185 of amplifier 22 is a full-wave rectified square wave. The width of the square wave pulses depends upon the magnitude of the bias signal supplied to the bias winding 186 of the amplifier, and upon the magnitude of the error voltage supplied to control winding 146.

A capacitor 187 and resistor 188 are connected in series between output terminals 184 and 185 of gating amplifier 22. The emitter electrode 189 of a unijunction transistor 190 is connected to the junction between this resistor and capacitor. The other electrodes of transistor 190 are connected in series with lead 184. A load resistor 191 is connected between one electrode 192 of the transistor 190 and the other lead 185. Electrode 192 is connected to the gate electrode 193 of a silicon-controlled rectifier (SCR) 194 whose cathode 195 is connected to lead 185. The anode 196 of SCR 194 is connected to a full-wave bridge rectifier circuit 197 which is supplied with alternating current by A-C supply 24. The output of rectifier circuit 197 is connected to the negative output terminal 198 of the controller and the cathode 195 is connected to the positive output terminal 199. A diode 200 is connected across the load 28 to limit switching and load-change transients to a safe value.

In this arrangement, the unijunction transistor 190 "fires" when the voltage across capacitor 187 reaches a critical value, thus presenting a low resistance path between electrodes 189 and 192. This allows capacitor 187 to discharge through gating electrode 193 of SCR 194 and cause SCR 194 to "fire" and conduct current from power supply 24 and full-wave rectifier 197 through the load 28. The SCR is held in this "on" or conducting condition by the current supplied from gating amplifier 22 through unijunction transistor 190 for the remainder of each square-wave pulse from amplifier 22. At the end of each such pulse, the voltage supplied to the transistor 190 falls below the "firing" level and the transistor is "turned-on." This "turns-off" SCR 194 until the next firing pulse is received.

In the above manner, the power supplied to the load is dependent upon the bias supplied to amplifier 22 and the magnitude and polarity of the error voltage. The bias of amplifier 22 can be set at a value such that the power supplied to the load is just sufficient to maintain the process condition at the desired value. Then, when the condition changes, an error signal is received by the controller and a greater or smaller amount of power is supplied to the load to minimize the deviation of the condition. It should be understood, however, that the purpose of providing such a bias for amplifier 22 is to ensure that the SCR will be turned off in a positive manner when no control signal is supplied to winding 146 of amplifier 22. Thus, this bias provides "fail-safe" protection for the SCR.

A pair of leads 201 is connected between terminals 198 and 199. Leads 201 are connected through a series limiting resistor 202 and a shunt resistor 203 to output meter 40 which measures the magnitude of the output voltage of the controller. Also connected across resistor 203 and in series with one another are a reset circuit 30 and a proportion circuit 32, between which two resistors 204 and 206 are connected. The functions of the reset and proportion circuits are well known. Their output is transmitted through output leads 208 and resistors 210 and 212 to the series-connected feedback windings 78 and 80 of first-stage error amplifier 18. In this manner, "proportion" and "reset" functions are provided for the controller.

The controller described in FIGURES 2 through 4 is specifically designed to drive the control winding of a high-power magnetic amplifier. Thus, the output power of this controller is relatively low, e.g., 100 to 1000 watts. However, the principles of this invention may be applied to a controller designed to produce relatively high output power. Such a high-power controller could be produced, for example, by increasing the number and/or size of the SCR's used in the controller, in accordance with the principles described in my co-pending U.S. patent application Ser. No. 174,891, filed on Feb. 21, 1962, now Patent No. 3,180,974.

The above description of the invention is intended to be illustrative and not limiting. Various changes or modifications in the embodiments described may occur to those skilled in the art and these can be made without departing from the spirit or scope of the invention as set forth in the claims.

I claim:

1. A balanceable magnetic amplifier comprising, in combination, saturable magnetic core means defining a pair of magnetic flux paths; control winding means associated with said core means for receiving an electrical input signal and developing in said flux paths magnetic flux of a magnitude dependent upon the magnitude of said input signal; load impedance means; load winding means associated with said core means for conducting current from an alternating current source through said load impedance means in the form of first components having magnitudes controlled by the flux in one of said flux paths and second components having magnitudes controlled by the flux in the other of said flux paths, and for conducting said components through said load impedance means in directions such that said first and second components develop in said load impedance means electrical signals which are substantially always of opposite polarity with respect to one another, and each of which alternates in polarity during each half-cycle of source current.

2. Apparatus for amplifying an electrical input signal, said apparatus comprising, in combination, saturable magnetic core means defining a pair of magnetic flux paths; means associated with said core means for receiving said electrical input signal and generating in each of said flux paths magnetic flux in an amount dependent upon the magnitude of said input signal; an electrical load; and means associated with said core means, adapted to be energized by an alternating current source, and connected to said load for developing across said load an electrical output signal whose magnitude is dependent upon the magnitude of said input signal, for conducting current controlled by the magnetic flux in a first one of said flux paths through said load in one direction during a first half-cycle of said source current and in the opposite direction during the next half-cycle of said source current, and for conducting current controlled by the magnetic flux in the second of said flux paths through said load in a direction which is at substantially all times opposite to the direction of flow of said current controlled by the flux in said first flux path.

3. Apparatus as in claim 2 including output terminal means and means for producing an output signal having the approximate average value of said electrical signal developed across said load for each full cycle of said source current, and for delivering said output signal to said output terminal means.

4. Apparatus as in claim 2 including means for causing the flux developed in each of said magnetic flux paths by said alternating current source to reverse in polarity during each half-cycle of source current.

5. Apparatus as in claim 2 in which the input signal-receiving and flux-generating means includes two separate windings, each magnetically coupled to a separate one of said flux paths, said windings being connected together in series in a phase sense such that the fundamental component of any voltage induced in either of said windings is opposed and cancelled by a similar induced voltage in the other of said windings.

6. Apparatus for amplifying an electrical input signal, said apparatus comprising, in combination; saturable magnetic core means defining a pair of magnetic flux paths; means associated with said core means for receiving said electrical input signal and generating in each of said flux paths magnetic flux in an amount dependent upon the magnitude of said input signal; an electrical load circuit comprising a pair of impedance elements connected to one another; and means associated with said core means, adapted to be energized by an alternating current source, and connected to said load circuit for developing across said load circuit an electrical signal whose magnitude is dependent upon the magnitude of said input signal, for conducting a first load current controlled by the magnetic flux in a first one of said flux paths through said load circuit in one direction during a first half-cycle of said source current and in the opposite direction during the next half-cycle of said source current, and for conducting a second load current controlled by the magnetic flux in the second of said flux paths through said load circuit in a direction which is at substantially all times opposite to the direction of flow of said first load current, said first and second load currents each flowing through only one of said load circuit impedance elements during a particular half-cycle of said source current, the element through which one of said first and second load currents flows being different from the element through which the other of said load currents flows during said particular half-cycle.

7. Apparatus as in claim 6 including output terminal means and means for producing an output signal having the approximate average value of said electrical signal developed across said load for each full cycle of said source current, and for delivering said output signal to said output terminal means.

8. A balanceable magnetic amplifier for amplifying an electrical input signal, said amplifier comprising, in combination; saturable magnetic core means defining a pair of magnetic flux paths; means associated with said core means for receiving said electrical input signal and generating in each of said flux paths magnetic flux in an amount dependent upon the magnitude of said input signal; an electrical load circuit, said load circuit including at least two impedance elements connected to one another; and means associated with said core means, adapted to be energized by an alternating current source, and connected to said load circuit for developing across said load circuit an electrical output signal whose magnitude is dependent upon the magnitude of said input signal, for conducting current controlled by the magnetic flux in a first one of said flux paths through a first one of said impedance elements during a first half-cycle of said source current and through a second one of said impedance elements during the next half-cycle of said source current, and for conducting current controlled by the magnetic flux in the second of said flux paths through said second impedance element during said first half-cycle and through said first impedance element during said next half-cycle, said currents flowing through said impedance elements in directions opposite to one another at substantially all times.

9. Apparatus as in claim 8 including output terminal means and means for producing an output signal having the approximate average value of said electrical signal developed across said load for each full cycle of said source current, and for delivering said output signal to said output terminal means.

10. A balanceable magnetic amplifier for amplifying an electrical input signal, said amplifier comprising, in combination; at least one pair of saturable magnetic cores; means associated with said cores for receiving said electrical input signal and generating in each of said cores magnetic flux in an amount dependent upon the magnitude of said input signal; an electrical load; said load including at least two impedance elements connected to one another; and means associated with said cores, adapted to be energized by an alternating current source, and connected to said load for developing across said load an output signal whose magnitude and polarity are dependent upon the magnitude and polarity of said input signal, said output signal developing means including a pair of windings wound upon each of said cores, a rectifying element for each of said windings, one of said windings on each of said cores being connected to said source and to one end of one of said impedance elements through one of said rectifying elements, and the other of said windings on each of said cores being connected to said source and one end of the other of said impedance elements through another one of said rectifying elements, the other ends of said impedance elements being connected together and to said source, one of said windings on each of said cores being adapted to conduct current only during a first half-cycle of source current and the other winding on each of said cores being adapted to conduct current only during the next half-cycle of said source current with the current flowing in a single direction in each impedance element, the direction of current flow in one impedance element being opposite to the direction of current flow in the other impedance element.

11. Apparatus as in claim 10 including output terminal means; and means for detecting the approximate average value of said electrical signal developed across said load for each full cycle of said source current, and for delivering to said output terminal means an electrical output signal having said average value.

12. A balanceable magnetic amplifier for amplifying an electrical input signal, said amplifier comprising, in combination; a pair of saturable magnetic cores; a pair of series-connected control windings each of which is wound upon one of said cores and is adapted to receive an electrical input signal and to generate in said core magnetic flux in an amount dependent upon the magnitude of said input signal; a load circuit consisting of a pair of substantially identical series-connected resistors; a source of alternating electrical current, said source including a center-tapped secondary winding of a transformer; a pair of output windings wound upon each of said cores; a rectifying element connected in series with each of said output windings, one end of a first one of said output windings on each of said cores being connected through its rectifying element to a first end terminal of said transformer secondary winding, the other ends of said first output windings being connected to opposite ends of said load circuit, one end of the second one of said output windings on each of said cores being connected through its rectifying element to the second end terminal of said transformer secondary windings, the other ends of said second output winding being connected to opposite ends of said load circuit, with the two windings on each of said cores being connected to opposite ends of said load and the common point between said impedance elements being connected to the center-tap of said secondary winding, said output windings being wound on each of said cores so that each develops a flux in said core opposite in polarity to that developed by the other winding on said core, the polarity of the magnetic flux developed in each core by said load windings being at substantially all times opposite to the polarity of the magnetic flux developed by said load windings in the other of said cores, said output windings being adapted to pass bucking currents through said impedance elements at all times; and an alternating-current bias winding on each of said cores, said bias windings being connected in series to one another and to the opposite end terminals of said transformer secondary winding.

13. Industrial process control apparatus for automatically regulating the flow of electrical energy so as to maintain a variable of the process at a desired value, said apparatus comprising, in combination; means for receiving an electrical signal developed in response to deviations of said process variable from said desired value; a balanceable magnetic amplifier having a pair of magnetic cores, control winding means coupled to said cores and connected to said receiving means, and output winding means for developing an amplified signal corresponding to said deviation signal; a balanced load; an alternating current source; and means associated with said cores, energized by said alternating current source, and connected to said load for developing across said load an electrical signal whose magnitude is dependent upon the magnitude of said input signals for conducting current controlled by the magnetic flux in a first one of said cores through said load in one direction during one half-cycle of said source current and in the opposite direction during the next half-cycle of said source current, and for conducting current controlled by the magnetic flux in the second of said cores through said load in a direction which is at substantially all times opposite to the direction of flow of said current controlled by the flux in said first core; a balanceable transistor amplifier having at least one pair of transistors connected together and adapted to receive and amplify the output signal developed by said balanceable magnetic amplifier; means connected to said output winding means for generating electrical gating signals spaced in time from one another in correspondence to the output of said transistor amplifier; silicon controlled rectifier means having control electrode means connected to said gating signal generating means for receiving said gating signals; a process control load; an alternating-current power source connected to said process control load and to said silicon controlled rectifier means; and feedback means connected between said process control load and the input of said balanceable magnetic amplifier, said gating signals controlling the conduction of power from said source to said process control load through said rectifier means to maintain said process variable at said desired value.

References Cited

UNITED STATES PATENTS

| | | | |
|---|---|---|---|
| 2,752,429 | 6/1956 | Hanson | 323—89 |
| 2,933,649 | 4/1960 | Bastian | 323—56 X |
| 2,946,000 | 7/1960 | Malick | 330—8 X |
| 3,016,493 | 1/1962 | Darling | 330—8 |
| 3,079,510 | 2/1963 | Hartwig | 307—66 |
| 3,102,229 | 8/1963 | Darling | 323—89 |
| 3,157,836 | 11/1964 | Jarvinen | 323—56 X |
| 3,180,974 | 4/1965 | Darling | 219—497 |
| 3,196,255 | 7/1965 | Beauchamp et al. | 323—89 |
| 3,227,943 | 1/1966 | Franz | 323—9 X |
| 3,323,029 | 5/1967 | Joseph | 318—17 |

JOHN F. COUCH, *Primary Examiner.*

A. D. PELLINEN, *Assistant Examiner.*